(12) United States Patent
Zhao et al.

(10) Patent No.: US 6,281,875 B1
(45) Date of Patent: *Aug. 28, 2001

(54) GRADIENT-BASED PIXEL INTERPOLATION

(75) Inventors: Jun Zhao, San Jose; Jonathan Hui, Fremont; Tong Zheng, Mountain View, all of CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,291

(22) Filed: Apr. 29, 1998

(51) Int. Cl.[7] ........................................ G60T 5/36
(52) U.S. Cl. .................... 345/136; 345/131; 345/431; 345/432; 345/439
(58) Field of Search ............................ 382/269; 345/431, 345/432, 136, 131, 127

(56) References Cited

U.S. PATENT DOCUMENTS

| 5,355,447 | 10/1994 | Knowlton | 395/139 |
|---|---|---|---|
| 5,410,616 | 4/1995 | Kidd | 382/47 |
| 5,422,827 | 6/1995 | Niehaus | 364/514 R |
| 5,426,723 | 6/1995 | Horsley | 395/128 |
| 5,471,572 | 11/1995 | Buchner et al. | 395/139 |
| 5,481,311 * | 1/1996 | Boie | 348/488 |
| 5,627,953 | 5/1997 | Yen | 395/139 |

OTHER PUBLICATIONS

"Adobe Photoshop 4.0 User Guide for Macintosh and Windows", Adobe Systems Inc. 1996, table of contents and pp. 36–49.

"HALO Imaging Library Programming Guide", Media Cybernetics 1995, table of contents and pp. 1–51 through 1–54.

* cited by examiner

*Primary Examiner*—Mark Zimmerman
*Assistant Examiner*—Philip H. Stevenson
(74) *Attorney, Agent, or Firm*—Fitzpatrick, Cella, Harper & Scinto

(57) ABSTRACT

In a method for determining a data value for a target pixel in a destination image based on data values for pixels in a source image, with the destination image being scaled relative to the source image, calculating a position in the source image based on position of a target pixel in the destination image, testing the presence of a diagonal gradient in the source image at the position determined in the calculating step, the testing step testing for the presence of a diagonal gradient by reference to values of pixels in the source image that surround the position calculated in the calculating step, responsive to the presence of a diagonal gradient in the testing step, calculating a data value for the target pixel based on interpolation of data values for diagonally-adjacent pixels in the source image, and responsive to the absence of a diagonal gradient in the testing step, calculating a data value for the target pixel based on interpolation of data values for at least all four surrounding pixels in the source image.

40 Claims, 7 Drawing Sheets

GRADIENT-BASED PIXEL INTERPOLATION

BACKGROUND OF THE INVENTION

1. Field of the Invention

The present invention relates to image processing by interpolation so as to obtain interpolated values between pixels in an existing image. In particular, the invention pertains to interpolation based on the existence of diagonal gradients in image data.

2. Description of the Related Art

Scaling is one common form of image processing, whereby image data of a first size is scaled to image data of a second size. Consider, for example, a situation in which a computer user is viewing image data on a computer screen, which physically appears to the user as having measurements of 3½×5 inches. Given screen resolution of 72 dpi (dots per inch), the image data measures 252×360 pixels. If such an image were thereafter to be printed, given a printer resolution of 600 dpi, the image would be printed to a size of 0.42×0.60 inches, which would be entirely unacceptable to the user. Accordingly, before printing, the image data originally comprised by 252×360 pixels must be scaled to a size of 2100×3000 pixels, so that when printed on the 600 dpi printer the resulting image again measures 3½×5 inches.

To scale images from a first pixel dimension to a second pixel dimension, interpolation is generally unavoidable. Interpolation is a procedure by which image data for pixels between existing pixels of the source image is derived. Many interpolation techniques have been proposed, such as bi-linear, bi-cubic and two-step linear interpolation. These techniques usually use the four (or more) surrounding pixels of existing data in order to derive pixel data for a target pixel.

Two-step linear interpolation will now be explained with reference to FIG. 4. As shown in FIG. 4, destination image data of size Q pixels high by R pixels wide is desired to be derived from source image data of size M pixels high by N pixels wide. With two-step linear interpolation, to derive a data value for a pixel in the destination image, data values for the four corresponding nearest neighbor pixels in the source image are found, and these four data values are interpolated horizontally to form two intermediate horizontal data values. These two intermediate data values are then further interpolated vertically to form the data value for the desired pixel in the destination image.

Specifically, and again referring to FIG. 4, to derive a data value for the pixel at position (r, q) in the destination image, the corresponding position (n, m) in the source image is derived using simple scaling equations as follows:

$$n = \frac{N}{R} r$$

$$m = \frac{M}{Q} q$$

Data values $V_1$, $V_2$, $V_3$ and $V_4$ for the four corresponding nearest neighbor pixels in the source image are then found. Values for these four pixels are interpolated horizontally and then vertically, using the following interpolation equation so as to obtain a value V for the target pixel at (r, q) in the destination image:

$$V=(V_1(1-x)+V_2 x)(1-y)+(V_3(1-x)+V_4 x)y$$

where x is the horizontal distance in the source image between the location of the target pixel and the location of the nearest neighbor pixel to the left of the target pixel, and where y is the vertical distance in the source image between the location of the target pixel and the location of the nearest neighbor pixel above the target pixel.

Mathematically, it can be shown that the foregoing equation is the same as the following equation, which can be interpreted based on relative areas:

$$V=V_1(1-x)(1-y)+V_2(x)(1-y)+V_3(1-x)(y)+V_4(x)(y)$$

Although such interpolation methods produce acceptable results in many situations, one situation in which these interpolation methods fail is where diagonal gradients or lines are present in the source image. When scaled, diagonal gradients and lines produce distortions that manifest themselves as periodic zigzag structures (also known as staircasing), corresponding to an aliasing that is introduced by the interpolation.

An example of these distortions is illustrated in FIGS. 1a through 1d. FIG. 1a is a view of an image with diagonal gradients scanned at 300 dpi. FIG. 1b is an enlarged view of the same image scanned at 600 dpi. It is desired in this example to scale the image shown in FIG. 1a up to the resolution of the image shown in FIG. 1b. In order to accomplish this scaling, pixel interpolation must be performed. FIG. 1c shows the result of scaling performed by a conventional pixel interpolation method, which has produced aliasing. This aliasing is evident in the staircasing pattern shown in FIG. 1c, which was not in the source image shown in FIG. 1a and which is an unwanted distortion of the image.

While other interpolation techniques such as bi-linear and bi-cubic interpolation tend to minimize such aliasing artifacts, these interpolation methods often decrease performance and sometimes do not reduce aliasing to any significant extent.

SUMMARY OF THE INVENTION

It is an object of the present invention to provide for improved interpolation which, because it is based on a detection of diagonal gradients, produces reduced aliasing while not significantly affecting performance.

According to one aspect of the invention, a diagonal gradient is detected based for example on data values of four corresponding nearest neighbor pixels in the source image. In the absence of a diagonal gradient, interpolation based at least on all four neighbor pixels, such as the aforementioned two-step linear interpolation, is performed so as to derive a data value for the target pixel in the destination image. On the other hand, if a diagonal gradient is detected, then interpolation is based only on two diagonally-adjacent pixels. Good performance has been found by interpolating across the gradient (i.e., along a diagonal edge), but better performance has been found by interpolating along the gradient (i.e., across the edge).

Preferably, detection of a diagonal gradient is performed by the simple expedient of comparing data values for the four corresponding neighbor pixels in the source image. If the first pair of diagonal pixels have data values that are close, while the second pair of diagonal pixels have data values that differ significantly, then it can be determined that a diagonal gradient is present.

Thus, in one aspect, the invention is a method of interpolation so as to obtain data values for a destination image based on data values for pixels in a source image, with the destination image being scaled relative to the source image. Based on pixel position in the destination image, a corresponding position in the source image is calculated. Based on the position, surrounding pixels in the source image are inspected so as to test for the presence of a diagonal gradient. In the absence of a diagonal gradient, a data value for the target pixel in the destination image is calculated by interpolation based on at least all four of the surrounding pixels. On the other hand, if a diagonal gradient is detected, a data value for the target pixel in the destination image is calculated based upon interpolation using only diagonally-adjacent pixels in the source image, and preferably diagonally-adjacent pixels along the gradient.

Preferably, a diagonal gradient is detected based on a comparison between pairs of diagonally-adjacent pixels in the source image, with the presence of a gradient being confirmed by a first pair of the diagonally-adjacent pixels having data values that are similar with a second pair of diagonally-adjacent pixels having data values that differ significantly. In the absence of a gradient, it is preferred that two-step linear interpolation be performed based on four surrounding pixels so as to determine a data value for the target pixel. On the other hand, in the presence of a gradient, it is preferred that interpolation be performed based on only a single pair of diagonally-adjacent pixels, and preferably the pair of diagonally-adjacent pixels that are along the gradient.

The advantages of the gradient-based pixel interpolation according to the invention are illustrated in FIGS. 1a through 1d. FIG. 1d shows the result of scaling the image of FIG. 1a using a representative method according to the invention. Compared to the image in FIG. 1c, which shows the result of conventional pixel interpolating, the image in FIG. 1d has far fewer artifacts and is much closer to FIG. 1b, the actual 600 dpi scanned image.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1A:
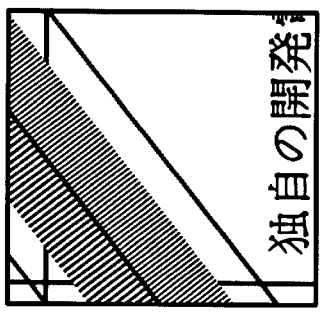
FIGS. 1a to 1d are views illustrating the advantages of pixel interpolation according to the invention over conventional pixel interpolation.
Figure 1B:
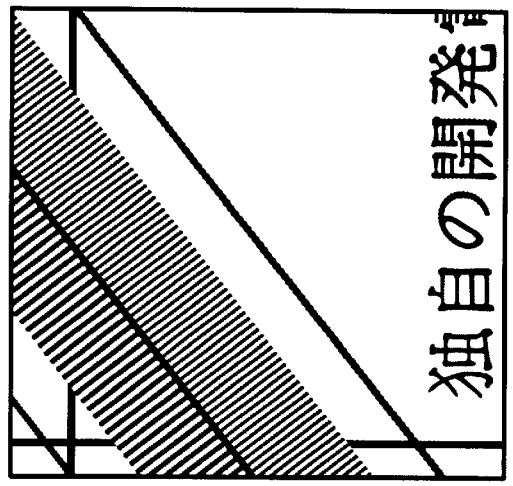
Figure 1C:
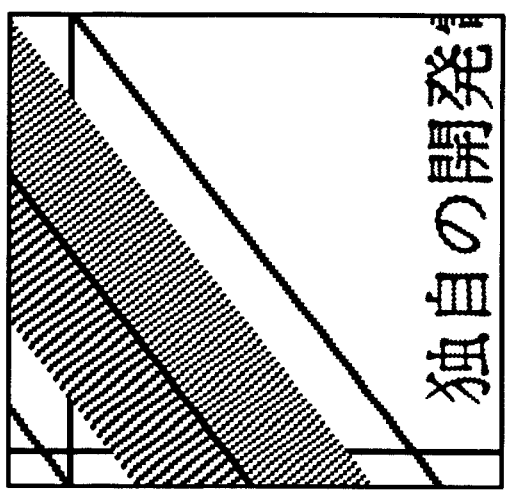
Figure 1D:
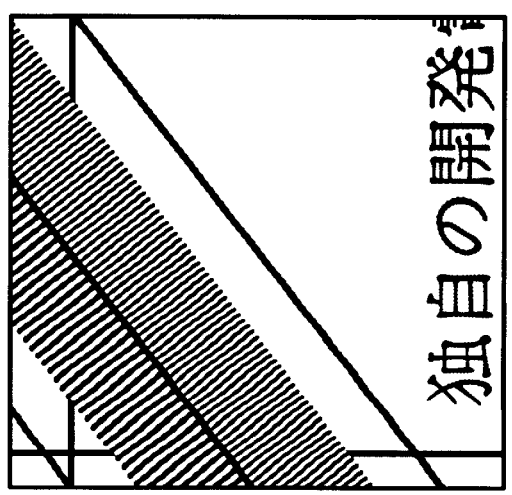
Figure 2:
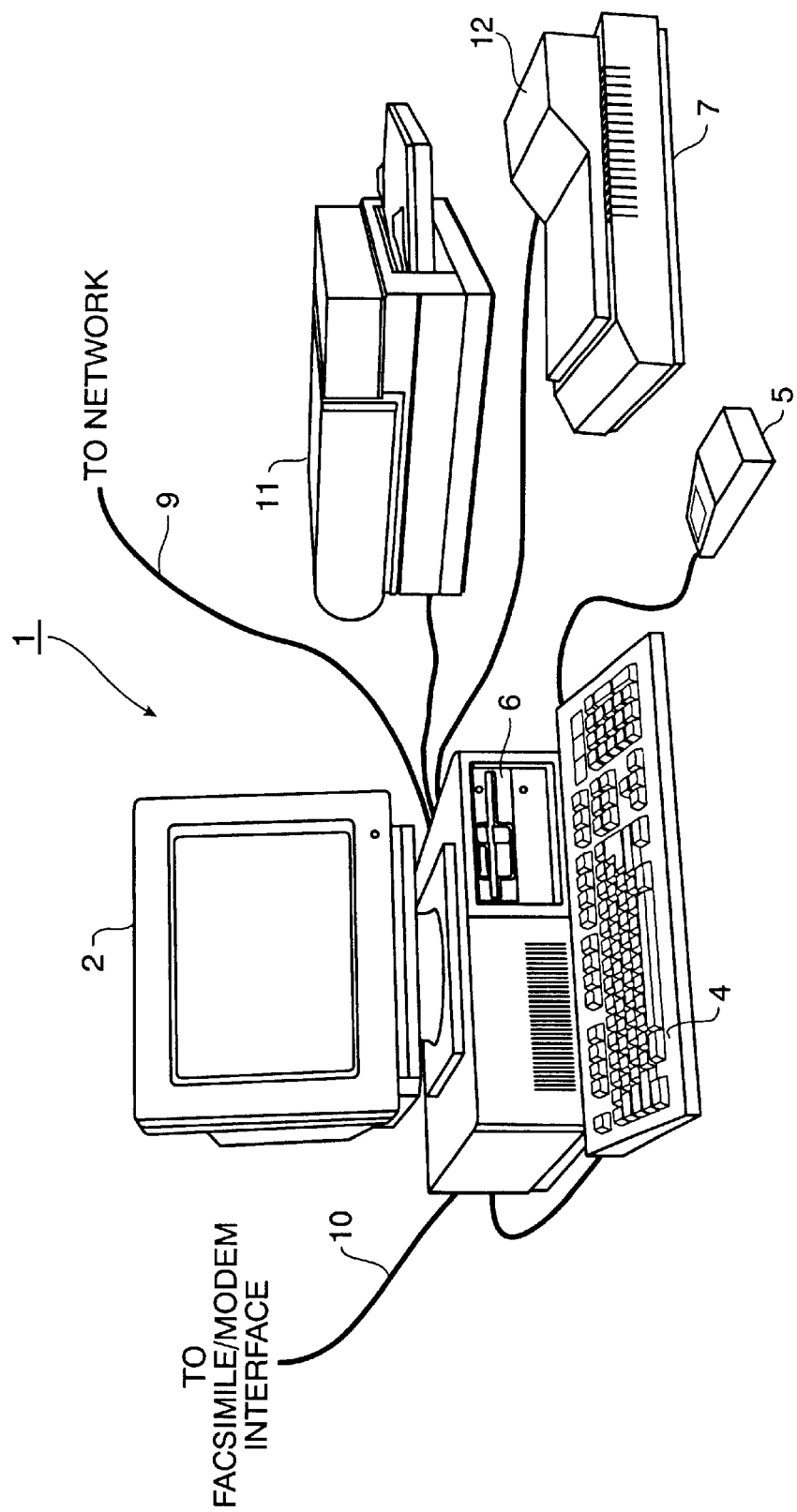
FIG. 2 is a representational view of a computer system in which the present invention may be utilized.

FIG. 2 is a representational view of a computer system in which the present invention may be utilized. Computer system 1 may be a Macintosh, PC-compatible, or other type of system having a windowing environment, such as Microsoft® Windows. Provided with computer system 1 are display 2 which may be a color monitor, keyboard 4 for entering user commands, and pointing device 5 such as a mouse for pointing to and for manipulating graphical user interfaces and other objects displayed on display 2.

Computer system 1 also includes a mass storage device such as fixed disk 6 for storing computer executable process steps for image processing applications, pixel interpolation code, other applications and the like. Such storage may also be provided by a CD-ROM (not shown).

Scanner 7 and film adapter unit 12 are image acquisition devices that are also included. Scanner 7 may be used to scan documents so as to provide images of those documents to an image processing application executing within computer system 1. Examples of scanner 7 are a Canon model CS600 scanner and a Canon model C5000 multipass scanner. Film adapter unit 12 is an adapter that attaches to certain models of scanner 7 so as to allow scanner 7 to perform similar functions with film instead of with documents. Of course, images may be input into computer system 1 using other image acquisition devices, such as a digital camera or the like. Images may also be input into computer system 1 from a variety of other sources, such as from a Local Area Network (LAN) through network interface 9. Printer 11 is provided for outputting processed images.

It should be understood that, although a programmable general purpose computer is shown in FIG. 2, a dedicated computer terminal or other type of data processing equipment can utilize the present invention.

Figure 3:
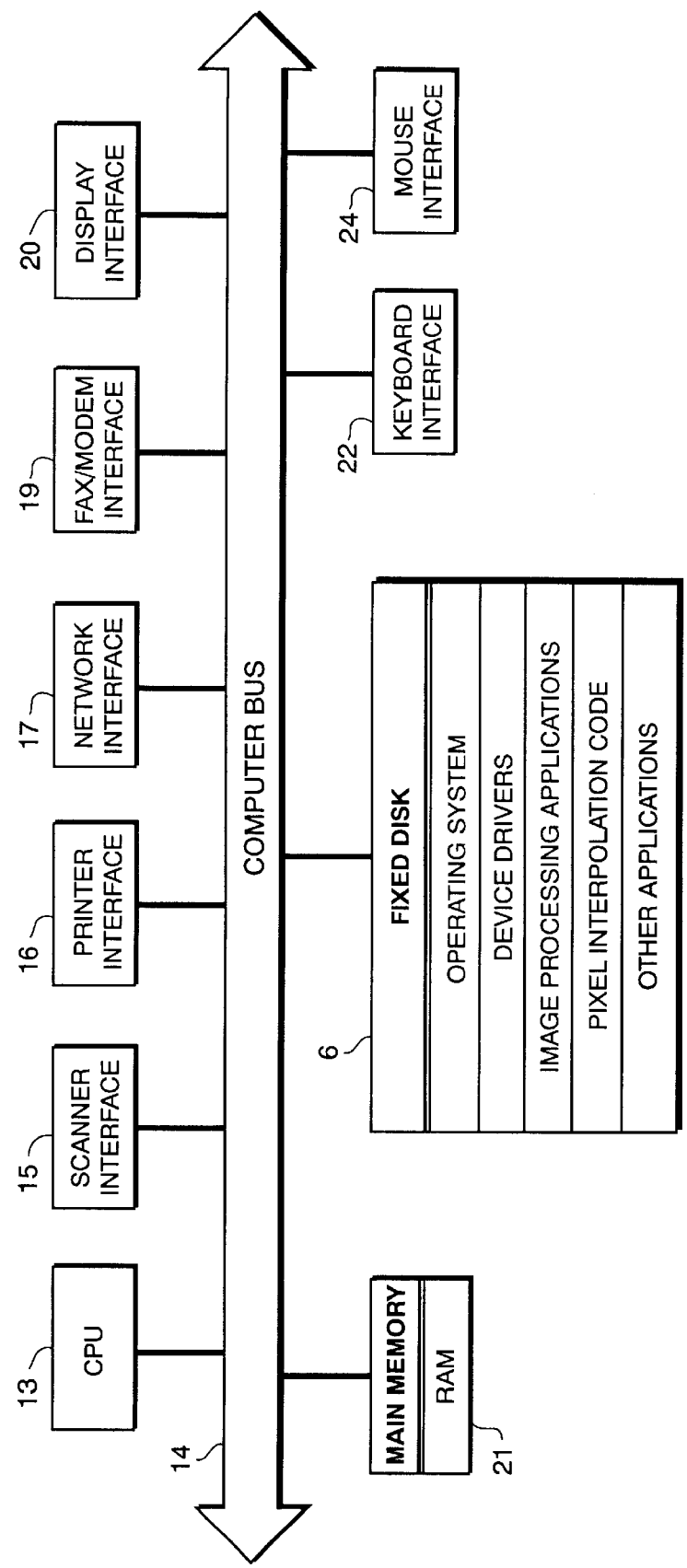
FIG. 3 is a detailed block diagram showing the internal architecture of computer system 1.

FIG. 3 is a detailed block diagram showing the internal architecture of computer system 1. As shown in FIG. 3, computer system 1 includes central processing unit (CPU) 13 which interfaces with computer bus 14. Also interfacing with computer bus 14 is scanner interface 15, printer interface 16, network interface 17, facsimile/modem interface 19, display interface 20, main random access memory (RAM) 21, fixed disk 6, keyboard interface 22, and mouse interface 24.

Main memory 21 interfaces with computer bus 14 so as to provide RAM storage to CPU 13 during execution of software applications. More specifically, CPU 13 loads process steps from fixed disk 6, another storage device, or some other source such as a network, into main memory 21. CPU 13 then executes the stored process steps from main memory 21 in order to execute applications. Data such as source and destination images can be stored in main memory 21, where the data can be accessed by CPU 13 during execution of the process steps.

As also shown in FIG. 3, fixed disk 6 typically contains an operating system, device drivers, image processing applications such as Adobe Photoshop or Corel Draw, pixel interpolation code, other applications and the like.

The gradient-based pixel interpolation of the invention can be implemented in numerous ways in computer system 1. For example, the invention can be embodied in stand-alone pixel interpolation code on fixed disk 6. In this embodiment, the pixel interpolation code can form a separate application program. Alternatively, the pixel interpolation code can be part of a dynamically-linked library for use by other applications. In other embodiments, the pixel-based interpolation of the invention can be directly incorporated into device drivers or other applications, particularly printer drivers and image processing applications. In addition, the invention need not be implemented in software. For example, the invention can be implemented in hardware forming part of computer system 1 or in hardware forming part of printer 11 or scanner 7. It will be understood by those skilled in the art that a great many other possible embodiments of the invention exist, and the foregoing is not an exclusive list of such embodiments.

The present invention can also be utilized in a great many different situations. For example, in the preferred embodiment, the pixel-based interpolation of the invention is used in converting a source image shown on display 2 into a higher-resolution destination image output by printer 11. In alternative embodiments, for example, the invention can be utilized in the following situations: converting a source image shown on display 2 at one size or resolution into a destination image shown on display 2 at a different size or resolution; converting a source image input from a LAN at one size or resolution to a destination image at a different size or resolution for display, printing, storage, or further image processing; converting a source image from a digital camera, film adapter unit, scanner or other image acquisition device into a destination image at a different size or resolution for display, printing, storage, or further image processing; and any other situation wherein a source image at one size or resolution is converted into a destination image at another size or resolution. It will be understood by those skilled in the art that the foregoing is not an exclusive list of the possible uses of the present invention.

Figure 4:
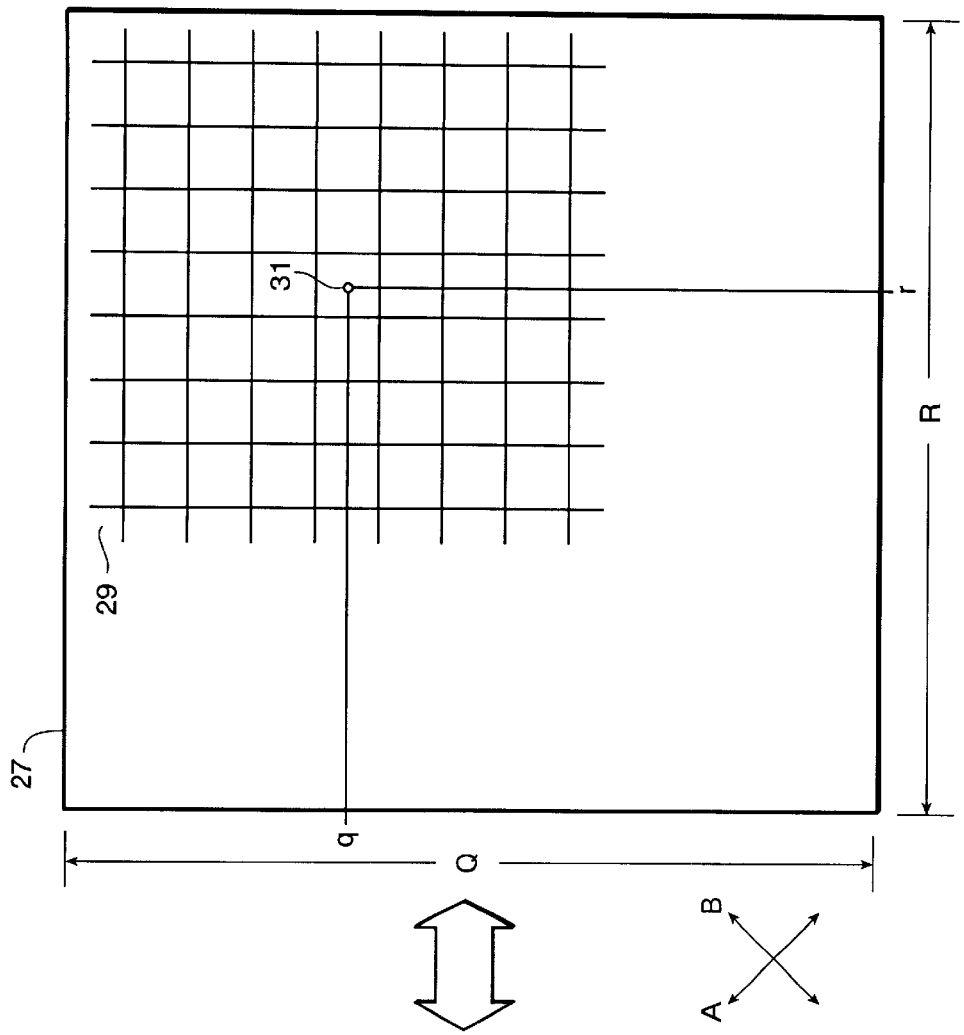
FIG. 4 is a representational view for describing pixel interpolation according to the invention.
Figure 4:
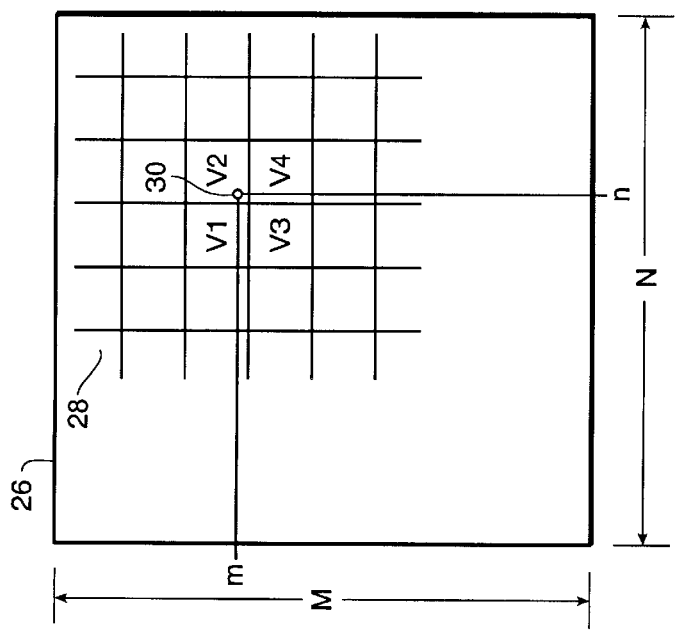

FIG. 4 is a representational view for describing pixel interpolation according to the invention. In FIG. 4, source image 26 measures M pixels high by N pixels wide. Destination image 27 measures Q pixels high by R pixels wide. Accordingly, source image array 28 contains data values for M×N pixels, and destination image array 29 contains data values for Q×R pixels.

The following disclosure is presented in terms of positions and data values in the source and destination image arrays. As will be apparent to those skilled in the art, these positions and data values correspond to positions and tones in the source and destination images. Thus, for example, calculating a position in source image array 28 corresponds to calculating a position in source image 26. Likewise, calculating a data value for a position in destination image array 29 is equivalent to calculating a tone for the corresponding target pixel in destination image 27.

In FIG. 4, the source and destination image arrays are shown representationally as grids. The grids for source image array 28 and destination image array 29 have the same grid spacing, indicating that the size (i.e., bit count) of the data values for the pixels in both image arrays are equal (e.g., 8 bits).

If source image 26 and destination image 27 are gray-scale images, then the data value associated with each pixel represents an individual gray-scale tone value. Alternatively, if source image 26 and destination image 27 are for color images, then each of source image 26 and destination image 27 typically represents a single color plane of the three color planes conventionally used to represent a color image. Accordingly, the data value associated with each pixel represents a tone value for that color plane.

Because destination image 27 has more pixels than source image 26, data values for at least some of the positions in destination image array 29 must be interpolated from data values for source image array 28. For example, for position 31 at (r, q) in destination image array 29, a data value can be interpolated from data values $V_1$ through $V_4$ surrounding position 30 at (n, m) in source image array 28.

The present invention concerns this interpolation process. In particular, the present invention minimizes artifacts that can result when interpolation is performed on images that have diagonal edges or gradients. It should be noted that diagonal edges result in diagonal gradients lying perpendicular to the edges. For example, a diagonal edge in the direction of arrow A in FIG. 4 results in a diagonal gradient in the direction of arrow B, and vice versa. However, diagonal gradients can exist without diagonal edges.

Briefly, the present invention is a method for determining a data value for a target pixel in a destination image based on data values for pixels in a source image, with the destination image being scaled relative to the source image. The invention includes the steps of calculating a position in the source image based on a position of the target pixel in the destination image, and testing for the presence of a diagonal gradient in the source image at the position determined in the calculating step, the testing step testing for the presence of a diagonal gradient by reference to data values for pixels in the source image that surround the position calculated in the calculating step. Responsive to the presence of a diagonal gradient in the testing step, a data value is calculated for the target pixel based on interpolation of data values for diagonally-adjacent pixels in the source image. Responsive to the absence of a diagonal gradient in the testing step, a data value is calculated for the target pixel based on interpolation of data values for at least all four surrounding pixels in the source image.

Figure 5:
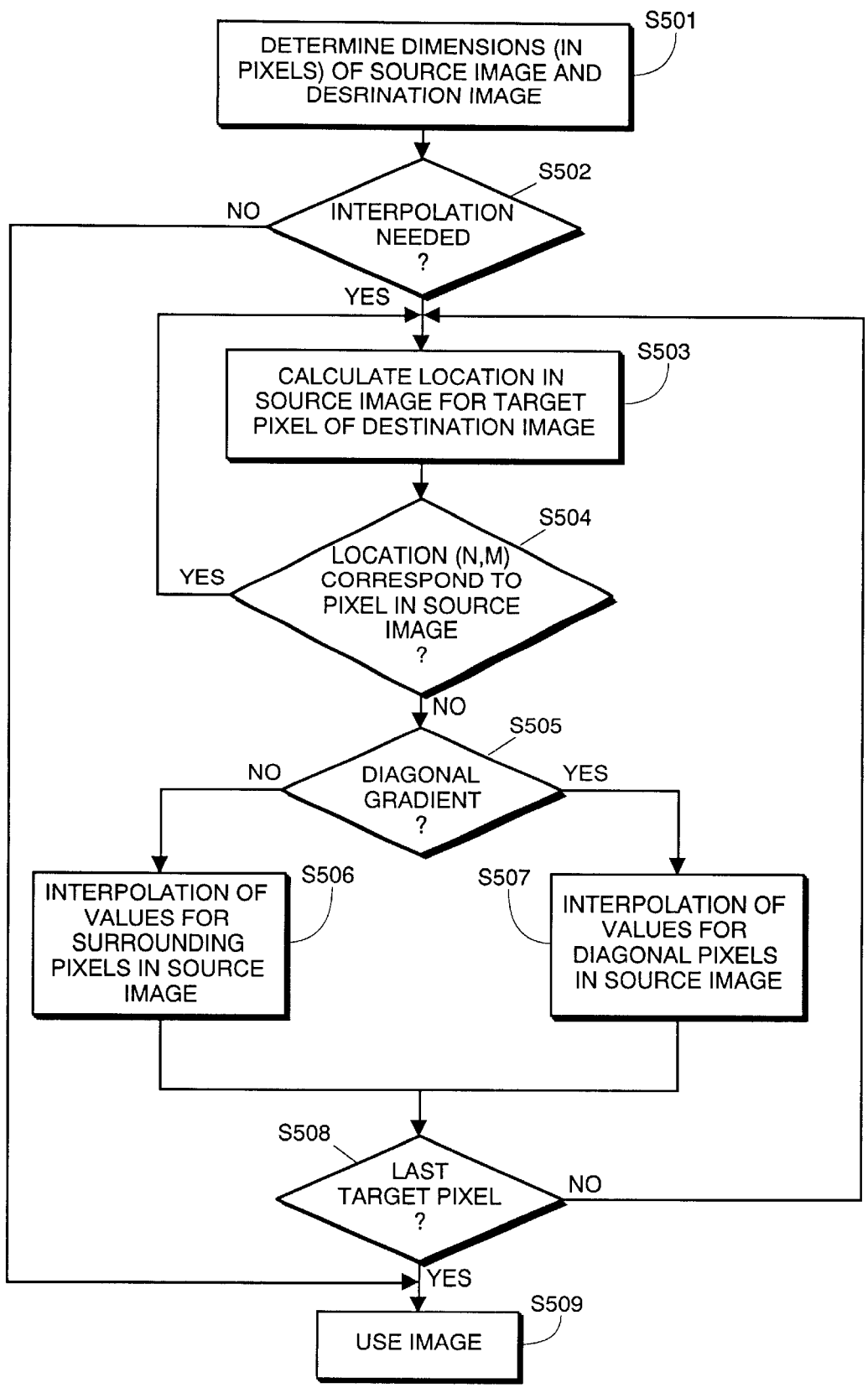
FIG. 5 is a flowchart for describing gradient-based pixel interpolation according to the invention.

Thus, in step S501 of FIG. 5, the dimensions in pixels of source image 26 and destination image 27 are determined. In other words, values for N, M, R and Q are determined. These values correspond to the dimensions of source image array 28 and destination image array 29, which store the data values for source image 26 and destination image 27, respectively.

In step S502, it is determined if interpolation is needed for generating the destination image. In particular, it is determined if the width of destination image 27 is different from the width of source image 26 or if the height of destination image 27 is different from the height of source image 26. In other words, it is determined if R is different from N or if Q is different from M.

If the dimensions of source image 26 and destination image 27 are the same, then interpolation is not needed. In that case, flow proceeds to step S509, and the destination image is either derived from the source image without interpolation or the source image is directly used as the destination image. On the other hand, if interpolation is needed, flow proceeds to step S503.

In step S503, a position in source image array 28 is calculated corresponding to a data value in destination image array 29 for a target pixel in destination image 27. For a target pixel with a data value at position (r, q) in destination image array 29, a position (n, m) in source image array 28 can be calculated using the following simple scaling equations:

$$n = \frac{N}{R}r$$

$$m = \frac{M}{Q}q$$

As an example, if source image 26 measures 100×50 pixels (i.e., N=100 and M=50) and destination image 27 measures 150×75 pixels (i.e., R=150 and Q=75), then for position 31 at (r, q)=(100, 50) in destination image array 29, position 30 in source image array 28 is at (n, m)=(66 ⅔, 33 ⅓).

Next, flow proceeds to step S504, where it is determined if position (n, m) exactly corresponds to a single pixel in source image 26. This determination can be made by checking if n and m are whole numbers. If they are whole numbers, then position (n, m) does exactly correspond to a single pixel in source image 26.

If position (n, m) does exactly correspond to such a pixel, then the data value at (n, m) in source image array 28 can be used directly in destination image array 29 at position (r, q). In that case, interpolation is not necessary, and flow returns to step S503 for the next target pixel.

If position (n, m) does not exactly correspond to a single pixel in source image 26 (i.e., n or m has a fractional component), then interpolation is needed. In that case, flow proceeds to step S505.

Note that in an alternative embodiment, step S504 is omitted, and flow always proceeds from step S503 to step S505.

In step S505, source image array 28 is tested for a presence of a diagonal gradient at position (n, m) calculated in step S503. First, four data values $V_1$ through $V_4$ surrounding position (n, m) in source image array 28 are determined. The relationship between position (n, m) and data values $V_1$ through $V_4$ is illustrated in FIG. 4. As mentioned above, these data values can represent tone levels for either a gray-scale image or a color plane of a color image.

In order to test for the diagonal gradient, data values for a diagonal pair of the four pixels corresponding to $V_1$ through $V_4$ are compared to determine whether they are similar. Data values for the other pair of the four pixels are compared to determine whether they are significantly different. If both of these conditions are met, a diagonal gradient is detected in the direction of the two pixels corresponding to significantly different data values. If a diagonal gradient is not detected in this direction, the data values are tested in a like manner for a diagonal gradient in the direction perpendicular to this direction.

Mathematically, whether or not two data values are similar can be defined with reference to a threshold. For example, in a system wherein data values can span a range of 0 to 255 (i.e., an 8-bit system), "similar" can be defined as an absolute difference between data values of less than 20. Likewise, "significantly different" can be defined in terms of a threshold. For example, two data values can be considered significantly different if the absolute difference between their values is greater than 50.

It should be noted that the diagonal gradient, and accordingly the diagonal edge, need not lie at a 45° angle in source image 26 to be detected. In particular, any line in source image 26 that is not completely horizontal or completely vertical will have at least one position wherein a diagonal gradient exists. If the gradient is sufficiently large, the above-described testing will detect the diagonal gradient at this position in source image 26. This is advantageous because any such diagonal gradient can result in aliasing problems when interpolating pixels. In contrast, such aliasing problems do not exist with completely-horizontal and completely-vertical lines.

If a diagonal gradient is not detected in step S505, flow proceeds to step S506. In step S506, a data value for position (n, m) in destination image array 29, which corresponds to the target pixel in destination image 27, is interpolated from the data values surrounding position (n, m) in source image array 28. In other words, a data value V for position (n, m) is interpolated from data values $V_1$ through $V_4$.

In order to perform the interpolation, values x and y are first calculated using the following equations:

x=fractional parts of n y=fractional parts of m

For example, in the numeric example given above for the determination of (n, m), x=⅔ and y=⅓.

Using data values $V_1$ through $V_4$, x and y, interpolation of data value V for position (n, m) in destination image array 29 is preferably performed with the following equation:

$$V=V_1(1-x)(1-y)+V_2(x)(1-y)+V_3(1-x)(y)+V_4(x)(y)$$

In contrast, if a diagonal gradient is detected in step S505, flow proceeds to step S507. In step S507, a data value for position (n, m) in destination image array 29, which corresponds to the target pixel in destination image 27, is interpolated from the data values diagonally adjacent to position (n, m) in source image array 28. In other words, a data value V for position (n, m) is interpolated either from data values $V_1$ and $V_4$ or from data values $V_2$ and $V_3$.

In more detail, if a diagonal gradient lies along the pixels in source image 26 corresponding to data values $V_2$ and $V_3$, then in one embodiment a data value V for position (n, m) is interpolated using data values $V_2$ and $V_3$. These two data values correspond to pixels lying along the gradient (i.e., across a diagonal edge).

In an alternative embodiment, a data value V is interpolated using data values $V_1$ and $V_4$, which correspond to pixels lying across the gradient (i.e., along a diagonal edge). The opposite operations are performed if a diagonal gradient lies along the pixels in source image 26 corresponding to data values $V_1$ and $V_4$.

Better performance has been found by interpolating along the gradient; therefore interpolation along the gradient is the preferred embodiment. However, interpolating both along the gradient and across the gradient produce superior results (i.e., fewer artifacts) than conventional methods.

Interpolation using data values $V_2$ and $V_3$ can be performed using the following equation:

$$V=(V_2(1-y)+V_3(y)+V_2(x)+V_3(1-x))\div 2$$

Likewise, interpolation using data values $V_1$ and $V_4$ can be performed using the following equation:

$$V=(V_1(1-y)+V_4 y+V_1(1-x)+V_4 x)\div 2$$

Flow proceeds to step S508 after both steps S506 and S507, where it is determined if a data value has been calculated for the last target pixel in destination image 27. If a data value has not been calculated for the last target pixel, flow returns to step S503 for processing of the next target pixel. If a data value has been determined for the last target pixel, flow proceeds to step S509, and the destination image is used in accordance with a particular situation. For example, in the preferred embodiment, the destination image is printed.

It should be noted that in an alternative embodiment, the target pixels of destination image 27 are directly printed as the data values for the target pixels are determined. Thus, in this alternative embodiment, there is no step S509.

Figure 6:
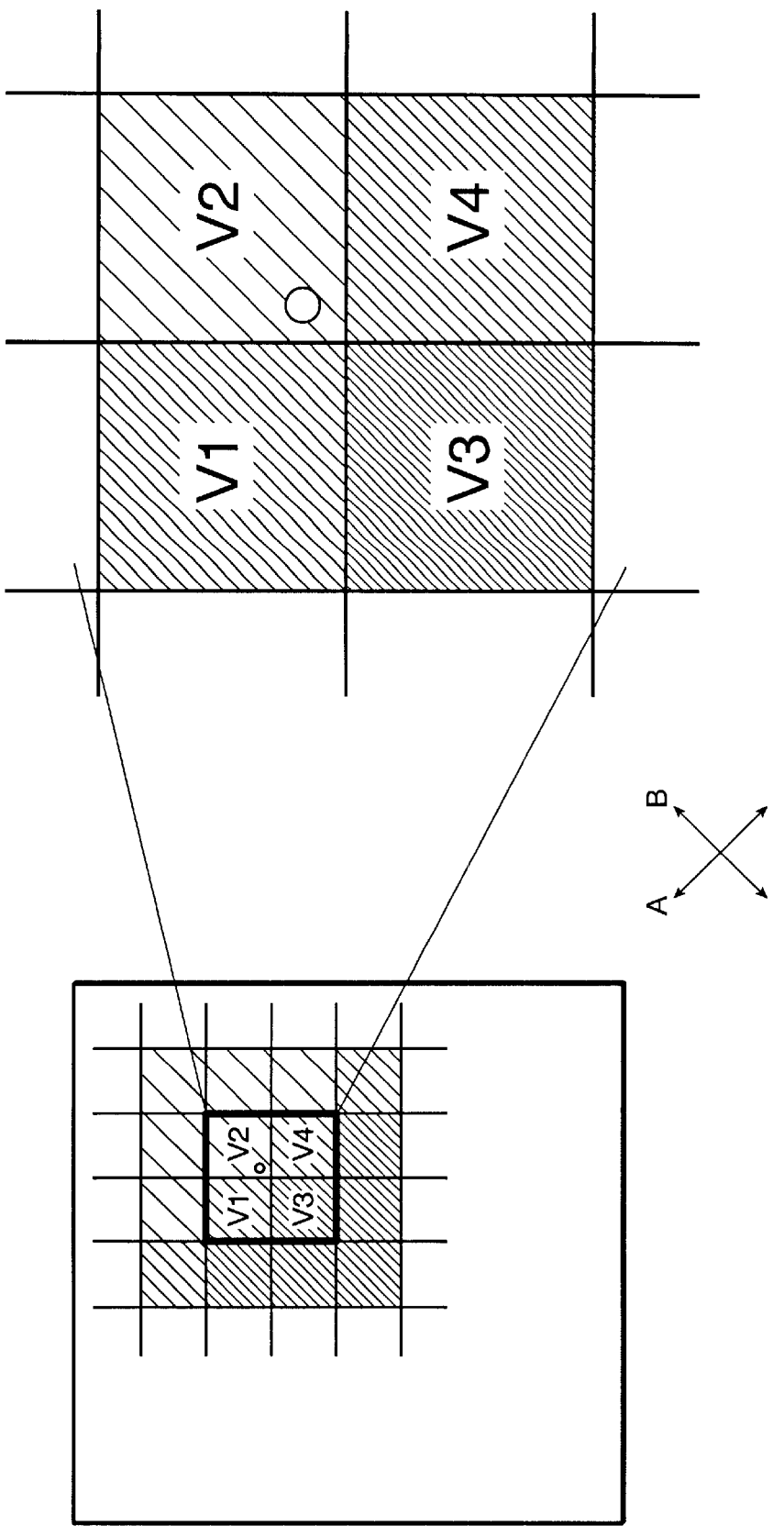
FIG. 6 is a representational view for showing detection of a diagonal gradient according to the invention.

FIG. 6 is a representational view for showing detection of a diagonal gradient according to the invention, which corresponds to step S505 above. In FIG. 6, the hatchings in the grids represent tones for pixels in source image 26 corresponding to the data values in source image array 28. It should be noted that source image array 28 actually holds data values for different tones, as discussed above. However, hatchings that correspond to different tones are shown in the grids in order to facilitate visualization of a diagonal gradient.

As shown by the hatchings in FIG. 6, data values $V_1$ and $V_4$ are similar because the tones of the pixels corresponding to data values $V_1$ and $V_4$ are substantially the same. Likewise, data values $V_2$ and $V_3$ are significantly different because the tones of the pixels corresponding to data values $V_2$ and $V_3$ are significantly different. Accordingly, the testing performed in step S505 determines that a diagonal gradient exists in the direction of arrow B, which lies in the direction of the pixels with data values $V_2$ and $V_3$.

As mentioned above, the diagonal gradient, and accordingly the diagonal edge, need not lie at a 45° angle in source image 26 to be detected. In particular, any line in source image 26 that is not completely horizontal or completely vertical will create a four-pixel block wherein two diagonally-adjacent pixels are significantly different and the other two diagonally-adjacent pixels are similar. Thus, the above-described testing will detect a diagonal gradient at the position of that block in source image 26.

Figure 7:
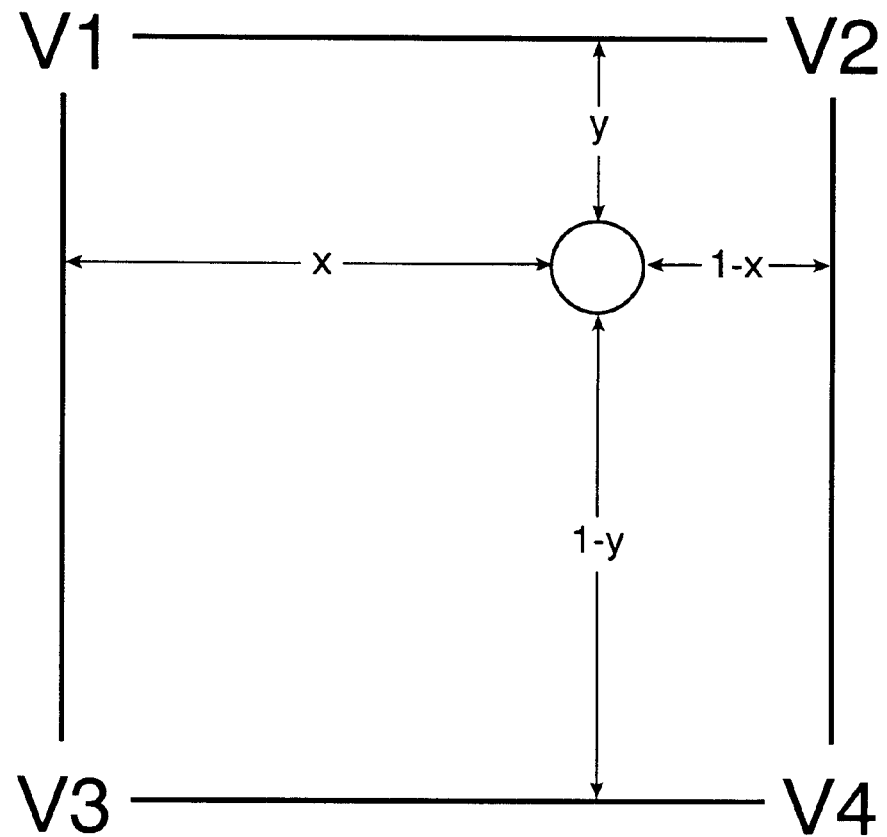
FIG. 7 is a view for describing calculation of a value for a target pixel based on interpolation of pixels.

FIG. 7 is a view for describing calculation of a value for a target pixel based on interpolation of pixels. As shown in FIG. 7, data values $V_1$ through $V_4$ have been determined for pixels surrounding position 30 in source image array 28. Values x any y correspond to the fractional distances between the data values and position 30 in the source image array.

Interpolation from data values surrounding position 30, which corresponds to step S506 above, is based on the relative areas of the rectangles shown in FIG. 7. That is, interpolation with all four data values involves multiplying each data value by the area of the rectangle furthest from the data value, and summing the resulting products.

Likewise, interpolation from data values diagonally adjacent to position 30, which corresponds to step S507 above, is based on the relative distances shown in FIG. 7. That is, each data value is scaled by the horizontal and vertical distances of the other diagonally adjacent data value from position 30.

The invention has been described with respect to a particular illustrative embodiment. It is to be understood that the invention is not limited to the above described embodiment and that various changes and modifications may be made by those of ordinary skill in the art without departing from the spirit and scope of the invention. In particular, the invention has equal applicability to interpolation methods other than two-step linear interpolation, such as methods that are not based on the relative areas and distances shown in FIG. 8.

What is claimed is:

1. A method for determining a data value for a target pixel in a destination image based on data values for pixels in a source image, with the destination image being scaled relative to the source image, comprising the steps of:

calculating a position in the source image based on a position of the target pixel in the destination image;

testing for a presence of a diagonal gradient in the source image at the position determined in said calculating step so as to select a method of interpolation based exclusively on the presence or absence of said diagonal gradient, said testing step testing for the presence of a diagonal gradient by reference to data values for pixels in the source image that surround the position calculated in said calculating step;

responsive to the presence of a diagonal gradient in said testing step, calculating a data value for the target pixel based on interpolation of data values for pixels diagonally adjacent to the calculated position in the source image; and responsive to the absence of a diagonal gradient in said testing step, calculating a data value for the target pixel based on interpolation of data values for at least all four pixels surrounding the calculated position in the source image.

2. A method according to claim 1, wherein in said step of testing for the presence of a diagonal gradient, testing is based on data values for four pixels surrounding the calculated position in the source image, and wherein testing for the presence of a diagonal gradient comprises the steps of comparing data values of a first diagonal pair of the four pixels to determine whether they are similar, and comparing data values of the second pair of the four surrounding pixels to determine whether they are significantly different.

3. A method according to claim 1, wherein in a case where a diagonal gradient is present, interpolation is across the diagonal gradient.

4. A method according to claim 1, wherein in a case where a diagonal gradient is present, interpolation is along the diagonal gradient.

5. A method according to claim 1, further comprising the step of determining a data value for the target pixel without using interpolation in a case that a pixel in the source image coincides exactly with the calculated position.

6. A method according to claim 1, wherein calculating a data value for the target pixel based on interpolation of data values for at least all four pixels surrounding the calculated position in the source image comprises a two-step linear interpolation.

7. A method according to claim 1, wherein calculating a data value for the target pixel based on interpolation of data values for at least all four pixels surrounding the calculated position in the source image comprises a bi-linear interpolation.

8. A method according to claim 1, wherein calculating a data value for the target pixel based on interpolation of data values for at least all four pixels surrounding the calculated position in the source image comprises a bi-cubic interpolation.

9. A method according to claim 1, wherein the source image and the destination image are gray-scale images.

10. A method according to claim 1, wherein the source image and the destination image are both single color planes of color images, each of the color images comprising multiple color planes.

11. An apparatus for determining a data value for a target pixel in a destination image based on data values for pixels in a source image, with the destination image being scaled relative to the source image, comprising:

a memory including a region for storing the source image, a region for storing the destination image, and a region for storing executable process steps; and a processor for executing the executable process steps;

wherein the executable process steps include steps of: (a) calculating a position in the source image based on a position of a target pixel in the destination image, (b) testing for a presence of a diagonal gradient in the source image at the position determined in said calculating step so as to select a method of interpolation based exclusively on the presence or absence of said diagonal gradient, said testing step testing for the presence of a diagonal gradient by reference to data values of pixels in the source image that surround the position calculated in said calculating step, (c) responsive to the presence of a diagonal gradient in said testing step, calculating a data value for the target pixel based on interpolation of data values for pixels diagonally adjacent to the calculated position in the source image, and (d) responsive to the absence of a diagonal gradient in said testing step, calculating a data value for the target pixel based on interpolation of data values for at least all four pixels surrounding the calculated position in the source image.

12. An apparatus according to claim 11, wherein in said step of testing for the presence of a diagonal gradient, testing is based on data values for four pixels surrounding the calculated position in the source image, and wherein said step of testing for the presence of a diagonal gradient comprises the steps of comparing data values of a first diagonal pair of the four pixels to determine whether they are similar, and comparing data values of the second pair of the four surrounding pixels to determine whether they are significantly different.

13. An apparatus according to claim 11, wherein in a case where a diagonal gradient is present, interpolation is across the diagonal gradient.

14. An apparatus according to claim 11, wherein in a case where a diagonal gradient is present, interpolation is along the diagonal gradient.

15. An apparatus according to claim 11, further comprising the step of determining a data value for the target pixel without using interpolation in a case that a pixel in the source image coincides exactly with the calculated position.

16. An apparatus according to claim 11, wherein calculating a data value for the target pixel based on interpolation of data values for at least all four pixels surrounding the calculated position in the source image comprises a two-step linear interpolation.

17. An apparatus according to claim 11, wherein calculating a data value for the target pixel based on interpolation of data values for at least all four pixels surrounding the calculated position in the source image comprises a bi-linear interpolation.

18. An apparatus according to claim 11, wherein calculating a data value for the target pixel based on interpolation of data values for at least all four pixels surrounding the calculated position in the source image comprises a bi-cubic interpolation.

19. An apparatus according to claim 11, wherein the source image and the destination image are gray-scale images.

20. An apparatus according to claim 11, wherein the source image and the destination image are both single color planes of color images, each of the color images comprising multiple color planes.

21. Computer-executable process steps stored on a computer-readable medium, the computer executable process steps to determine a data value for a target pixel in a destination image based on data values for pixels in a source image, with the destination image being scaled relative to the source image, the computer-executable process steps comprising:
    code to calculate a position in the source image based on a position of a target pixel in the destination image;
    code to test for a presence of a diagonal gradient in the source image at the position determined in said calculating step so as to select a method of interpolation based exclusively on the presence or absence of said diagonal gradient, said testing step testing for the presence of a diagonal gradient by reference to data values for pixels in the source image that surround the position calculated by said code to calculate;
    code to calculate, responsive to the presence of a diagonal gradient in said code to test, a data value for the target pixel based on interpolation of data values for pixels diagonally adjacent to the calculated position in the source image; and
    code to calculate, responsive to the absence of a diagonal gradient in said code to test, a data value for the target pixel based on interpolation of data values for at least all four pixels surrounding the calculated position in the source image.

22. Computer-executable process steps according to claim 21, wherein said code to test for the presence of a diagonal gradient tests based on values for four pixels surrounding the calculated position in the source image, and wherein said code to test for the presence of a diagonal gradient comprises code to compare data values of a first diagonal pair of the four pixels to determine whether they are similar, and code to compare data values of the second pair of the four surrounding pixels to determine whether they are significantly different.

23. Computer-executable process steps according to claim 21, wherein in a case where a diagonal gradient is present, interpolation is across the diagonal gradient.

24. Computer-executable process steps according to claim 21, wherein in a case where a diagonal gradient is present, interpolation is along the diagonal gradient.

25. Computer-executable process steps according to claim 21, further comprising code to determine a data value for the target pixel without using interpolation in a case that a pixel in the source image coincides exactly with the calculated position.

26. Computer-executable process steps according to claim 21, wherein said code to calculate a data value for the target pixel based on interpolation of data values for at least all four pixels surrounding the calculated position in the source image comprises code to perform a two-step linear interpolation.

27. Computer-executable process steps according to claim 21, wherein said code to calculate a data value for the target pixel based on interpolation of data values for at least all four pixels surrounding the calculated position in the source image comprises code to perform a bi-linear interpolation.

28. Computer-executable process steps according to claim 21, wherein said code to calculate a data value for the target pixel based on interpolation of data values for at least all four pixels surrounding the calculated position in the source image comprises code to perform a bi-cubic interpolation.

29. Computer-executable process steps according to claim 21, wherein the source image and the destination image are gray-scale images.

30. Computer-executable process steps according to claim 21, wherein the source image and the destination image are both single color planes of color images, each of the color images comprising multiple color planes.

31. A computer-readable medium which stores computer-executable process steps, the computer-executable process steps to determine a data value for a target pixel in a destination image based on data values for pixels in a source image, with the destination image being scaled relative to the source image, the computer-executable process steps comprising:
    a calculating step to calculate a position in the source image based on a position of a target pixel in the destination image;
    a testing step to test for a presence of a diagonal gradient in the source image at the position determined in said calculating step so as to select a method of interpolation based exclusively on the presence or absence of said diagonal gradient, said testing step testing for the presence of a diagonal gradient by reference to data values of pixels in the source image that surround the position calculated in said calculating step;

a calculating step to calculate, responsive to the presence of a diagonal gradient in said testing step, a data value for the target pixel based on interpolation of data values for pixels diagonally adjacent to the calculated position in the source image; and a calculating step to calculate, responsive to the absence of a diagonal gradient in said testing step, a data value for the target pixel based on interpolation of data values for at least all four pixels surrounding the calculated position in the source image.

32. A computer-readable medium according to claim 31, wherein in said testing step to test for the presence of a diagonal gradient, testing is based on data values for four pixels surrounding the calculated position in the source image, and wherein said testing step to rest for the presence of a diagonal gradient comprises the steps of comparing data values of a first diagonal pair of the four pixels to determine whether they are similar, and comparing data values of the second pair of the four surrounding pixels to determine whether they are significantly different.

33. A computer-readable medium according to claim 31, wherein in a case where a diagonal gradient is present, interpolation is across the diagonal gradient.

34. A computer-readable medium according to claim 31, wherein in a case where a diagonal gradient is present, interpolation is along the diagonal gradient.

35. A computer-readable medium according to claim 31, further comprising a determining step to determine a data value for the target pixel without using interpolation in a case that a pixel in the source image coincides exactly with the calculated position.

36. A computer-readable medium according to claim 31, wherein the calculating step to calculate a data value for the target pixel based on interpolation of data values for at least all pixels surrounding the calculated position in the source image comprises a two-step linear interpolation.

37. A computer-readable medium according to claim 31, wherein the calculating step to calculate a data value for the target pixel based on interpolation of data values for at least all pixels surrounding the calculated position in the source image comprises a bi-linear interpolation.

38. A computer-readable medium according to claim 31, wherein the calculating step to calculate a data value for the target pixel based on interpolation of data values for at least all pixels surrounding the calculated position in the source image comprises a bi-cubic interpolation.

39. A computer-readable medium according to claim 31, wherein the source image and the destination image are gray-scale images.

40. A computer-readable medium according to claim 31, wherein the source image and the destination image are both single color planes of color images, each of the color images comprising multiple color planes.

* * * * *

UNITED STATES PATENT AND TRADEMARK OFFICE
CERTIFICATE OF CORRECTION

PATENT NO. : 6,281,875 B1
DATED : August 28, 2001
INVENTOR(S) : Jun Zhao et al.

It is certified that error appears in the above-identified patent and that said Letters Patent is hereby corrected as shown below:

Drawings,
Fig. 5, Step S501, "DESRINATION" should read -- DESTINATION --.

Column 9,
Line 22, "any" should read -- and --.

Column 13,
Line 18, "rest" should read -- test --.

Signed and Sealed this

Thirtieth Day of April, 2002

Attest:

Attesting Officer

JAMES E. ROGAN
Director of the United States Patent and Trademark Office